United States Patent [19]

Sarbadhikari et al.

[11] Patent Number: 5,477,264
[45] Date of Patent: Dec. 19, 1995

[54] ELECTRONIC IMAGING SYSTEM USING A REMOVABLE SOFTWARE-ENHANCED STORAGE DEVICE

[75] Inventors: Kamal K. Sarbadhikari, Penfield; John R. Fredlund; Kenneth A. Parulski, both of Rochester, all of N.Y.

[73] Assignee: Eastman Kodak Company, Rochester, N.Y.

[21] Appl. No.: 219,608

[22] Filed: Mar. 29, 1994

[51] Int. Cl.$^6$ ............................................. H04N 5/76
[52] U.S. Cl. ........................... 348/231; 348/233; 348/552
[58] Field of Search .................................. 348/222, 231, 348/232, 233, 552; 358/909.1, 906; 258/903, 909; H04N 5/76, 5/907, 5/92

[56] References Cited

U.S. PATENT DOCUMENTS

| | | | |
|---|---|---|---|
| 4,500,183 | 2/1985 | Tanikawa | 354/21 |
| 4,524,381 | 6/1985 | Konishi | 358/29 |
| 4,574,319 | 3/1986 | Konishi | 358/335 |
| 4,728,978 | 3/1988 | Inoue et al. | 354/289.1 |
| 4,853,733 | 8/1989 | Watanabe et al. | 354/412 |
| 4,855,779 | 8/1989 | Ishikawa et al. | 354/412 |
| 4,994,844 | 2/1991 | Azuma et al. | 354/412 |
| 5,016,107 | 5/1991 | Sasson et al. | 358/209 |
| 5,018,017 | 5/1991 | Sasaki et al. | 358/209 |
| 5,023,637 | 6/1991 | Lorton et al. | 354/106 |
| 5,027,214 | 6/1991 | Fujimori | 358/209 |
| 5,032,855 | 7/1991 | Taniguchi et al. | 354/21 |
| 5,070,355 | 12/1991 | Inoue et al. | 354/413 |
| 5,086,311 | 2/1992 | Naka et al. | 354/195.1 |
| 5,103,250 | 4/1992 | Arifuku et al. | 354/106 |
| 5,138,459 | 8/1992 | Roberts | 348/552 |
| 5,142,310 | 8/1992 | Taniguchi et al. | 354/106 |
| 5,153,729 | 10/1992 | Saito | 358/209 |
| 5,155,513 | 10/1992 | Matsumura et al. | 354/106 |
| 5,226,145 | 7/1993 | Moronaga | 348/231 |
| 5,262,868 | 11/1993 | Kaneko | 348/233 |

OTHER PUBLICATIONS

USSN 988,517 filed Dec. 10, 1992, Entitled "Electronic Camera with Memory Card Interface to a Computer", Kenneth A. Parulski et al.
USSN 085,519 filed Jun. 30, 1993, Entitled "Apparatus and Method for Adaptively Interpolating a Full Color Image Utilizing Chrominance Gradients", Claude A. Laroche et al.
Personal Computer Memory Card International Association (PCMCIA) "PC Card Standard", Release 2.0, Sep. 1991.

Primary Examiner—James J. Groody
Assistant Examiner—Sherrie Hsia
Attorney, Agent, or Firm—David M. Woods

[57] ABSTRACT

An electronic imaging system includes a digital electronic camera for capturing and storing images in a removable storage device, which is also preloaded with enhancement files for effecting the operation of the system. The camera includes an optical section for establishing the optical parameters of image capture, an image sensing section for electrically capturing the image, and a signal processing section for operating upon the electrically captured image prior to storage. The several sections of the camera are coordinated and controlled by a programmable processor, which is capable of receiving the enhancement files preloaded into the storage device. These files may contain software for updating the operating code of the camera, for modifying the electrically captured image in selected ways, for modifying camera in special situations, or for communicating non-captured image-like data, such as text and image overlays, to the camera.

47 Claims, 11 Drawing Sheets

VACANT PORTION OF "PRE-EXPOSED" IMAGE

CAPTURED IMAGE

"PRE-EXPOSED" IMAGE DATA FILE

COMBINED IMAGE

ELECTRONIC IMAGING SYSTEM USING A REMOVABLE SOFTWARE-ENHANCED STORAGE DEVICE

FIELD OF THE INVENTION

This invention pertains to the field of electronic imaging and, in particular, to electronic imaging with an electronic still camera that utilizes a removable storage device for storing images.

BACKGROUND OF THE INVENTION

As understood in the prior art, a digital electronic still camera is a device which uses an electronic sensor to capture an image; signal processing to modify the captured image signal, e.g., as a function of ambient light, and to represent it numerically; and some storage device to preserve the numerical image data. Ordinarily, the image storage device is merely a receptacle for the image data.

It is further known for a digital electronic still camera to use a removable storage device, such as an integrated circuit memory card, to store images. For instance, U.S. Pat. No. 5,016,107 describes an electronic still camera utilizing image compression and providing digital storage in a removable memory card having a static random access memory. Software that controls the camera operation is located in non-removable programmable read only memory (PROM) integrated circuits in the camera. In this camera, the integrated circuits in the removable memory card store image data and a directory locating the data.

Other electronic camera systems described in the prior art record an image header along with the digital image data. The header typically describes some characteristics about the image or the camera. For instance, in U.S. Pat. No. 5,018,017, such header information indicates the classification of the information; the imaging system in use; the date and time; the compression mode; as well as image-specific information, such as flash use, white balance data, exposure value, and shutter speed. Furthermore, U.S. Pat. No. 5,153,729 shows memory capacity, a free area pointer, a battery expiration date, and a write inhibit flag in the header area of a memory card. Typically, each system conveys such characteristic data from the electronic camera by way of the memory card (where the data is temporarily stored) to a peripheral device, such as a player. The object is to increase the downstream functionality of the system by allowing utilization of image-related data in subsequent processing of the image data in a downstream peripheral device. The camera or imaging device generally utilizes little of the stored image characteristic data, one exception being data regarding the utilization of the storage device itself, i.e., how much memory space is remaining for further pictures. In the latter case, the camera accesses such data to display utilization to the camera user.

Coordination between a camera and a computer is generally shown in patent application Ser. No. 988,517, "Electronic Camera with Memory Card Interface to a Computer", which was filed on Dec. 10, 1992 and assigned to common assignee with the present application. This application describes a camera that is specially shaped so as to plug directly into the memory card slot of a portable computer; the camera is then usable as a unit with the portable computer. The camera contains EPROM memory with code for in-camera white balance and gamma correction, and also stores the compiled code which is used (by the computer) to operate the camera and to process the images from the sensor color filter array to obtain a full resolution, color corrected image. The image data is captured by the camera and directly downloaded to the computer, where it is processed with code obtained from the camera. As with prior memory card systems, the code is used downstream (in the computer) to process image data.

In a camera intended for acquisition of image data for use in a computer, such as described in Ser. No. 988,517, it is well understood that data corresponding to captured images may also be stored in a storage device that is capable of being removed from the camera. Such a storage device is often considered analogous to film in a conventional film camera. Just as it is known to encode film with marks that are useful in downstream processing of the film, it is also known for an electronic image storage device to contain non-image data which is useful in modifying the image data. Following the film analogy, such additional data is useful in downstream processing, such as in a computer, to modify the image data. Unlike film, however, the additional non-image data may be read by a variety of peripheral devices, including the camera itself. This provides an opportunity to deal with a number of imaging problems.

For instance, in most known electronic imaging systems, the software which controls the camera ordinarily cannot be updated without purchasing an entirely new camera, containing a lens, CCD image sensor, etc. (Albeit, a few high end film cameras utilize a removable program module from which the camera can download exposure algorithms.) It is well known that computer programs are updated more regularly than computer hardware, since the software can be refined to provide higher performance (i.e. better image quality) or more features while using the same hardware. An electronic camera can use a programmable digital processor controlled by software. Such a camera offers an opportunity for software updates, if the system is designed to facilitate such updates. What is needed is a method for software updates of the camera algorithms for higher performance, and for adding new features to a camera. Such a method should be quick and convenient for the user, preferably without requiring the use of additional storage modules. Existing memory devices are capable of limited two-way communication with an electronic camera, such as to report to the camera on memory space availability. An opportunity exists for enhancing such "upstream" communication to provide altogether new applications for an electronic camera.

SUMMARY OF THE INVENTION

The opportunity in the prior art for upstream utilization of the memory capability of a removable storage device is embodied, according to the invention, by an electronic imaging system including an electronic camera for capturing and storing images in a removable storage device which is also preloaded with software for operating the imaging system. The imaging system includes an optical section for establishing the optical parameters of image capture, an image sensing section for electrically capturing an image provided by the optical section, a signal processing section for processing the electrically captured image, a programmable processor for controlling the sections of the system, and means for loading the programmable processor with the software preloaded in the removable storage device for affecting operation of one or more of the sections of the system.

Consequently, the invention provides an electronic still photography system which can be controlled by software located on a removable memory (e.g., a memory card) used with an electronic still camera. Known cameras use the removable memory to store images and data related to an individual image (date, color temperature of the illuminant, etc.) or data related to the camera (type of color filter array, sensor defect locations, etc.) which is transferred to an image reproducing device. Except for data about memory space, the communication is one way. A camera according to this invention, however, uses the removable media to transfer software previously recorded on the memory card (such as improved camera firmware to process the image, or a special access code) to the camera. The advantageous effect is that the operation of the camera or playback device can be improved some years after the camera is purchased, by using an "enhanced" memory card containing improved software for operating the camera or playback device. Moreover, such two-way communication opens use of the storage device to other enhancement possibilities, e.g., to modify image data in selected ways, to modify camera performance for special situations, or to communicate non-captured images (special overlays) to the camera.

BRIEF DESCRIPTION OF THE DRAWINGS

The prior art and the invention will be described in relation to the drawings, wherein.

DESCRIPTION OF THE PREFERRED EMBODIMENTS

Because electronic still cameras employing electronic sensors are well known, the present description will be directed in particular to elements forming part of, or cooperating more directly with, apparatus in accordance with the present invention. Elements not specifically shown or described herein may be selected from those known in the art.

Figure 1:
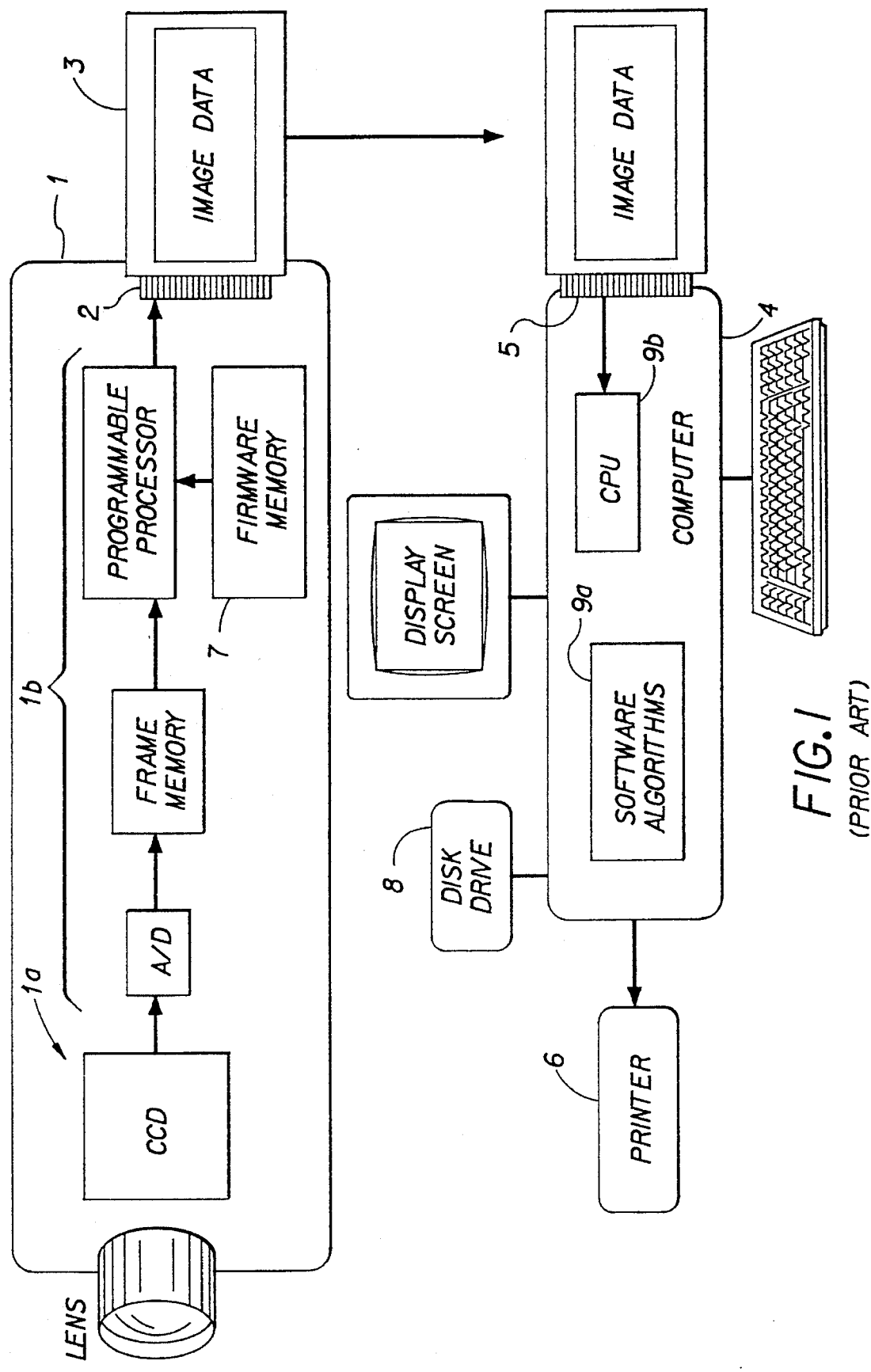
FIG. 1 is a diagram of a known electronic imaging system incorporating an electronic camera for inputting images to a computer.

FIG. 1 shows a known electronic still photography system useful for inputting images to a computer. The system includes an electronic camera 1 with an electronic sensing section 1a, a digital processing section 1b, a memory card slot 2, a removable memory card 3, a computer 4 with a built-in memory card reader 5, and a printer 6. Images are captured by the sensing section 1a in the camera 1, manipulated in the processing section 1b, stored on the memory card 3, and transferred from the card 3 to the computer 4. The software used to control the sensing and processing sections 1a and 1b in the camera is entirely located in firmware memory 7 in the camera 1 and cannot be updated without opening the camera cover, unsoldering the firmware memory circuit, and replacing it with a new circuit containing updated code. The application software used to control the playback operations of the computer is supplied, at least in part, by the camera manufacturer. It is stored in a computer hard drive 8, and downloaded to a computer random access memory (RAM) memory 9a, where the program is used by the central processing unit (CPU) 9b. To update this software, the user must be provided with a new program on a floppy disc, which can be transferred to the hard drive 8. For example, the floppy disk may contain a "plug-in" module for an imaging software application provided with the camera. The plug-in contains both code to allow the images to be downloaded from the camera to the computer, and software code to create color images from the digitized camera image data. The software code implements algorithms for processing the color filter array sampled image data supplied by the camera. These algorithms include color interpolation, color balance, and color correction. A typical color interpolation algorithm is described in greater detail in U.S. Ser. No. 085,519, "Apparatus and method for adaptively interpolating a full color image utilizing chrominance gradients", filed Jun. 30, 1993, which is assigned to Eastman Kodak Company.

The invention is based on the recognition that the storage device, i.e., the memory card 3 in FIG. 1, need not be primarily oriented to storage of data for downstream (i.e., computer) processing. The storage device may additionally contain files (data, code, etc.) which are capable of upstream modification of image data and camera performance. This provides an opportunity for affecting image data during the capture and manipulation stages prior to storage. Furthermore, these files may be accessed automatically by the camera, or selected by the user by means of appropriate intervention through the camera. Therefore, the removable image storage device is capable of two-way communication with the camera. That is, the card slot interface is not limited to "dumping" image data downstream to the removable storage device, but also allows communication from the removable storage device upstream to the camera as well. Inasmuch as the files are software which enhance the operation of the camera, the digital storage device may be viewed as a software-enhanced device, and the files are hereinafter referred to as enhancement data files.

A number of advantages arise from such two-way communication. Enhancement files can be included in the digital storage device which are not in themselves images. Image processing software, look-up tables, matrices, compression tables, dynamic range optimization tables, and other files capable of affecting the captured image data can be included in the digital storage device. Typical algorithms which can be modified, or updated, thus include color filter array interpolation algorithms, noise reduction algorithms, edge sharpening algorithms, color reproduction algorithms, compression algorithms, or dynamic range optimization algorithms. In this manner, the camera need only be capable of executing the functions and transformations contained in the storage device, and need not require the storage capacity to contain all information necessary to execute the processing of the image data. Such non-image files, which cause processing of the captured image data, may process the captured image data such that the most "true-to-scene" reproduction is achieved, or instead provide special effects of the kind which change the image into some desired alteration of the original scene.

Another type of non-image file which can be contained in the digital storage device enhances the operation of the camera. Enhancement files can be included which control capture parameters such as exposure time, aperture setting, flash range output, and so on. A particular set of control parameters can be used to tailor the capture parameters to the type of scene or subject being captured. This type of file might also allow diagnostic tests of the camera to insure proper operation and to detect fault conditions in the camera system. A further type of enhancement file contained in the storage device comprises pre-existing image data files, i.e., files with images not captured by the camera system. Such files are accompanied by code which instructs the camera on how to merge the pre-existing image files with those captured by the camera. In this manner graphic overlays and text can be superimposed on the captured images by the camera. Proper execution of such a feature might include a user interface for selection of pre-existing image and overlay combinations, and also a viewfinder which helps the user to compose the captured image so as to complement the selected overlay. Whether for image processing, enhanced performance, or pre-existing images, the algorithms themselves are conventional and not themselves part of this invention. However, where they are stored, and how they are used, is within the scope of the invention. In that connection, another function of the invention is to store replacement, or updated, software files in the digital storage device so that software updates can be added to the camera after its initial purchase by the subsequent purchase of appropriately-enhanced storage devices.

The invention also concerns the sequence of execution of operations made possible by files contained in the image storage device. It is anticipated that the capture of images may occur in a rapid and/or random fashion. It may be undesirable to interrupt image processing to initiate another capture. If that is the case, processing above and beyond that which is necessary to achieve initial storage would not have to occur until the camera is no longer in a "ready" mode. That is, no processing takes place until the camera is no longer being used to capture images and is placed in an "off" or "sleep" mode. Alternatively, the camera could interrupt processing operations to carry out capture operations. Once the capture is complete, the camera can return to processing operations.

Figure 2:
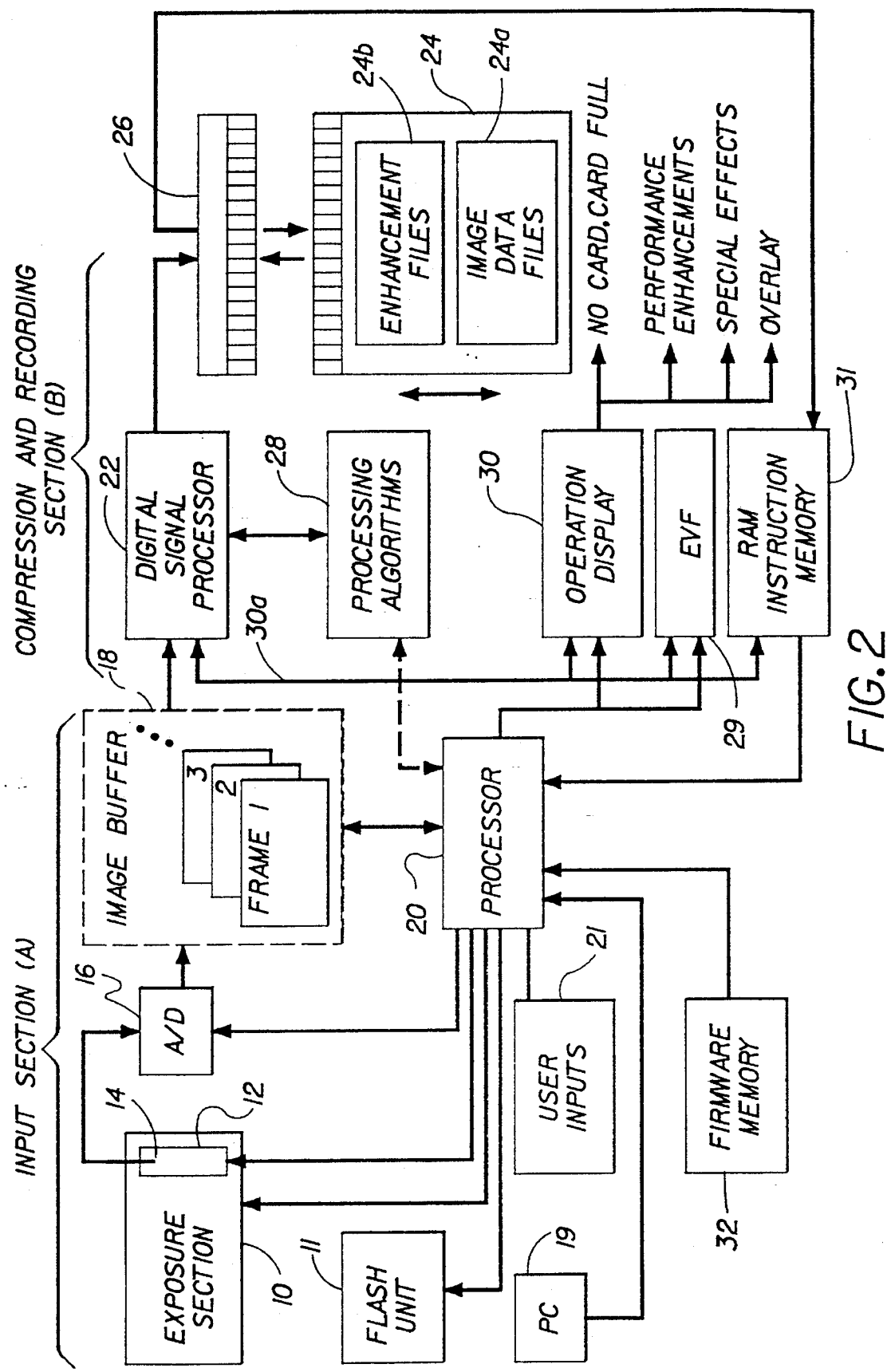
FIG. 2 is a block diagram of an electronic camera configured according to the invention to receive and process enhancement files.

FIG. 2 shows an electronic still camera capable of using a "software enhanced" storage device as taught by the invention. The electronic still camera is divided generally into an input section A and a compression and recording section B. The input section A includes an exposure section 10 for directing image light from a subject (not shown) toward an image sensor 12. A flash unit 11 may be used to illuminate the subject. Although not shown, the exposure section 10 includes conventional optics for directing the image light through a diaphragm, which regulates the optical aperture, and a shutter, which regulates exposure time. The sensor 12, which includes a two-dimensional array of photosites corresponding to picture elements of the image, is a conventional charge-coupled device (CCD) using, e.g., either well-known interline transfer or frame transfer techniques. The sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image signal from the analog input signals for each picture element.

The digital signals are applied to an image buffer 18 for storing one or more images, albeit shown in FIG. 2 as a random access memory (RAM) with storage capacity for a plurality of still images. A programmed control processor 20 generally controls the input section A of the camera by initiating and controlling exposure (by operation of the diaphragm and shutter (not shown) in the exposure section 10), by controlling the flash unit 11, by generating the horizontal and vertical clocks needed for driving the sensor 12 and for clocking image information therefrom, and by enabling the A/D converter 16 in conjunction with the image buffer 18 for each signal segment relating to a picture element. (The control processor 20 would ordinarily include a microprocessor coupled with a system timing circuit.) Exposure control would typically be effected by using ambient light information from a photocell 19.

Once a certain number of digital image signals have been accumulated in the image buffer 18, the stored signals are applied to a programmed digital signal processor 22, which controls the throughput processing rate for the compression and recording section B of the camera. The algorithms and other operating code used by the processor 22 are stored in the algorithm memory 28. The digital signal processor 22 compresses each still image stored in the image buffer 18 according to a known image compression algorithm, such as the well-known JPEG (Joint Photographic Experts Group) discrete cosine transformation-based compression algorithm. The processor 22 applies a compression algorithm from the memory 28 to the digital image signals, and sends the compressed signals to a removable storage device via an interface 26. While a memory card 24 is shown in this system as the storage device, other devices may be used, such as a floppy disk magnetic medium, a small hard drive, or optical storage (in the latter cases, suitable conventional reading/writing apparatus would be provided in the camera, e.g., magnetic or optical read/write head, etc.) A representative memory card is a card adapted to the PCMCIA card interface standard, such as described in the *PC Card Standard, Release* 2.0, published by The Personal Computer Memory Card International Association, Sunnyvale, Calif., September 1991. Moreover, while compression is shown in the camera of FIG. 2, compression is not a necessary feature of the invention, and uncompressed data could be stored instead.

The memory card 24 contains solid state memory 24a, such as Flash EPROM memory, which the card uses to store image data files. In addition, the memory card 24 contains additional memory to store enhancement data files 24b to modify the camera operation, or the images captured by the camera, or to provide pre-existing overlay images. These software enhancements are normally programmed by the card manufacturer before the card is sold to the user, and can be stored in the Card Information Structure (CIS) of the PCMCIA Format (as described in the aforementioned *Release* 2.0). The "software enhancement" code may be stored in separate non-erasable memory on the card 24, or in a portion of the memory space of the memory 24a used to store the image data.

The input section A operates at a rate commensurate with normal operation of the camera while compression, which may consume more time, can be relatively divorced from the input rate. The exposure section 10 exposes the sensor 12 to image light for a time period dependent upon exposure requirements, for example, a time period between 1/1000 second and several seconds. The image charge is then swept from the photosites in the sensor 12, converted to a digital format, and written into the image buffer 18. The repetition rate of the driving signals provided by the control processor 20 to the sensor 12, the A/D converter 16 and the buffer 18 are accordingly generated to achieve such a transfer. The processing throughput rate of the compression and recording section B may be determined by the character of an image, i.e., the amount of detail versus redundant information, and the speed of the digital signal processor 22.

An operation display panel 30 is connected to the control processor 20 for displaying information useful in operation of the camera. Such information might include typical photographic data, such as shutter speed, aperture, exposure bias, color balance (auto, tungsten, fluorescent, daylight), high/low resolution, low battery, low light, exposure modes (aperture preferred, shutter preferred), and so on. Moreover, other information unique to this type of camera is displayed. For instance, the memory card 24 would ordinarily include a directory signifying the beginning and ending of each stored image. This would show on the display 30 as either (or both) the number of images stored or the number of image spaces remaining, or estimated to be remaining. In certain applications, an electronic viewfinder 29 would be included for displaying images either before or after storage.

The control processor 20 also generates important information about the condition and capability of the memory card 24. Specifically, the interface 26 is queried for the presence of a card 24 and, if no card is connected, a "no card" display is produced on the operation display 30. Likewise, if a card is present but it is full of images, a "card full" display is produced. While not shown, the display 30 may show the number of "remaining images." If enhancement files 24b are present on the card 24, they can be identified on the operation display 30. For instance, performance enhancements, such as special set-up for portraiture, can be identified; processing enhancements, such as special effects, can be identified; and overlay enhancements, such as birthday or holiday picture borders, can be identified. User intervention in order to specify the several enhancement opportunities, or to set conventional capture parameters, is obtained from a user inputs section 21. Such inputs could be one or more selector switches operable alone or in conjunction with prompts from the operation display 30 or the electronic viewfinder 29.

The camera also contains firmware memory 32 with operating code for the camera, as well as RAM instruction memory 31 connected to receive code from the memory card 24. When the memory card 24 is inserted into the camera, the processor 20 uses the firmware algorithms in the memory 32 to determine if the memory card 24 contains "software enhancements" which can be used by the camera. If not, the firmware algorithms supplied with the camera in the memory 32 are used by the programmable processor 20. If the card does contain appropriate "software enhancements", however, these are downloaded from the enhancement file section 24b of the card 24 to the RAM instruction memory 31 and used by the programmable processor 20 in place of some portion of the firmware algorithms supplied with the camera from the firmware memory 32. In this way the camera can execute new, improved algorithms which provide higher quality pictures or special features. More than one algorithm file may also be downloaded, or different functions may be combined into a single file. Any combination of image processing files may be used.

After the images from the camera are stored on the memory card 24, the card is inserted into the computer memory card reader 5 (see FIG. 1). In certain applications where the memory card may contain "software enhancements" which can be used by the computer, the computer uses the software supplied with the camera to check if the memory card contains such algorithms. If not, the software algorithms supplied with the camera (and stored in the drive 8) are downloaded to the computer RAM memory 9a used by the CPU 9b to process the image. If the card does contain appropriate "software enhancements", however, these are downloaded from the card to the RAM instruction memory 9a and used by the CPU 9b in place of some portion of the software algorithms from the hard drive 8. This allows a quick and convenient way of updating the algorithms used by the computer, without requiring a special update disk to be distributed to users. These image processing algorithms can be applied by the camera either during initial processing, when the image is first captured, processed, and stored, or post-capture.

According to the invention shown in FIG. 2, the images are transferred from the camera to the computer via the removable memory, rather than a cable interface. Therefore, the camera does not have to be in the same location as the computer. This makes it possible to view the images from the camera in many different locations, on many different computers, as long as the computer has the ability to both accept the removable memory and correctly process the image data. Since the removable memory can be used to store code for processing the image data in the computer, this code can include the color interpolation, color balance, and correction algorithms described in connection with FIG. 1, or future improved versions of these algorithms. The advantage of storing the algorithms on the removable memory is that it eliminates the need for a separate means of supplying the code, such as the floppy disk. Supplying the algorithms along with the images on the removable memory, such as a PCMCIA card, makes it possible for any computer capable of reading the image data from the card to also download and utilize the algorithms needed to process the image data in order to create a full color image. This makes it convenient to view the images on almost any computer which includes a PCMCIA card connector, without requiring that the computer be supplied with a special plug-in to provide the image processing code, such as for a color filter array interpolation.

Apart from updating camera algorithms, the enhanced algorithm files might be tailored in a specific manner for memory cards sold for particular applications. In electronic still imaging systems, the resolution and/or photographic speed of the camera may be altered by, e.g., subsampling and/or electrical gain adjustments. A type of non-image data file providing such adjustments would be included in image data storage devices which are designed for specific capture applications. In the same manner that certain film speeds are selected for films, an image storage device might be selected for action photography, portraiture, or infant photography. An appropriate set of parameters for image capture would be incorporated in the associated non-image data file. One possible application is portraits. In this application, the non-image data file would provide that the color reproduction should be optimized for skin tones, the edge sharpening should not be too severe, and the color filter array algorithm should minimize color aliasing at the expense of reduced sharpness. Other applications could also be envisioned.

Figure 3:
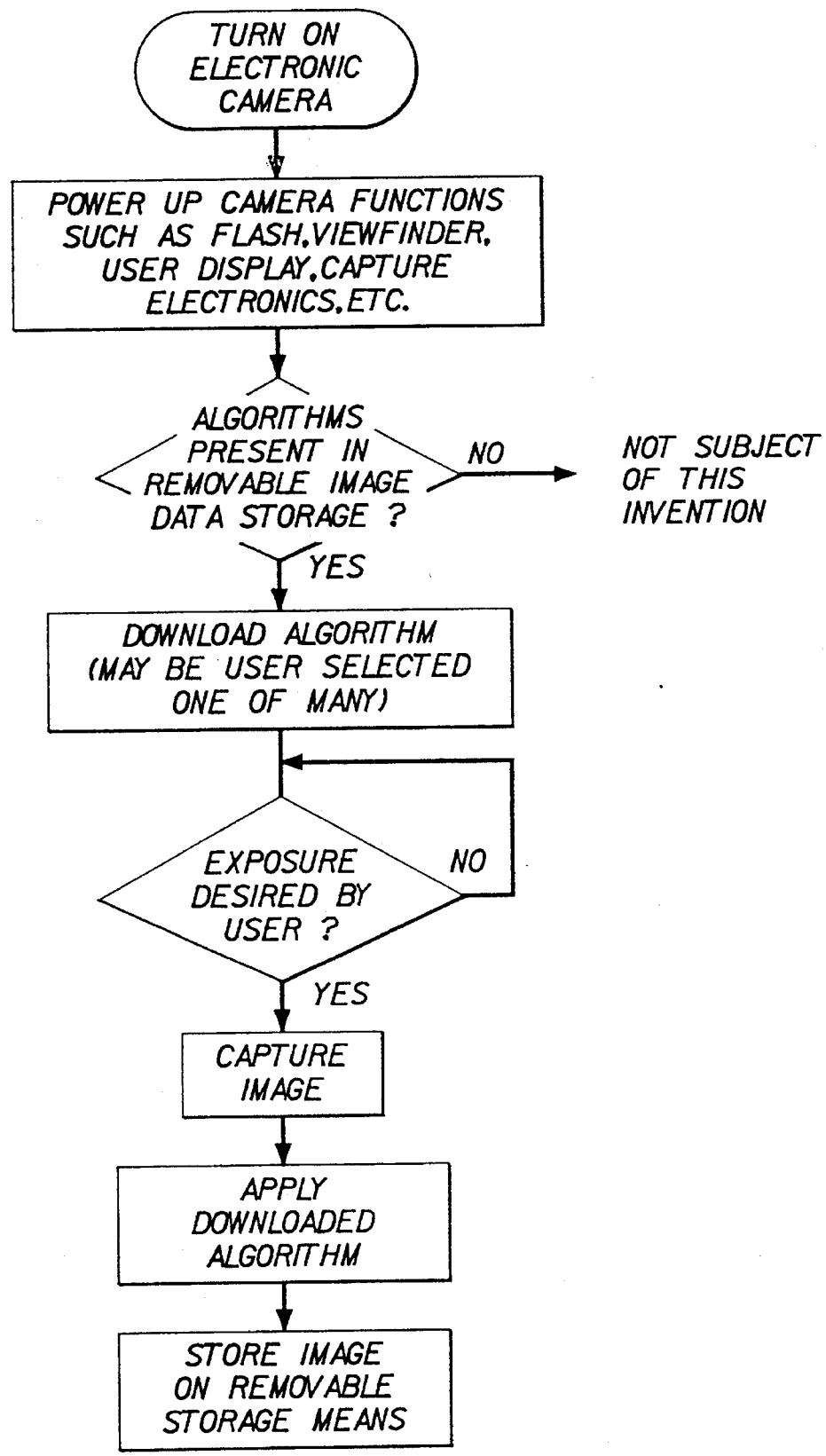
FIG. 3 is a flow diagram of the steps involved in applying an enhancement algorithm to the camera of FIG. 2.
Figure 4:
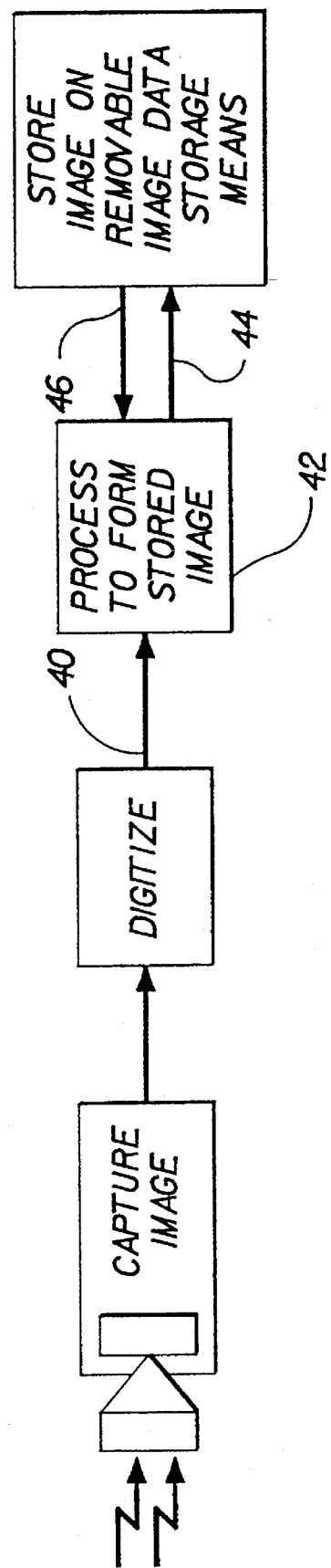
FIG. 4 is a block diagram of the capture chain showing the points at which processing according to the invention may occur.
Figure 5:
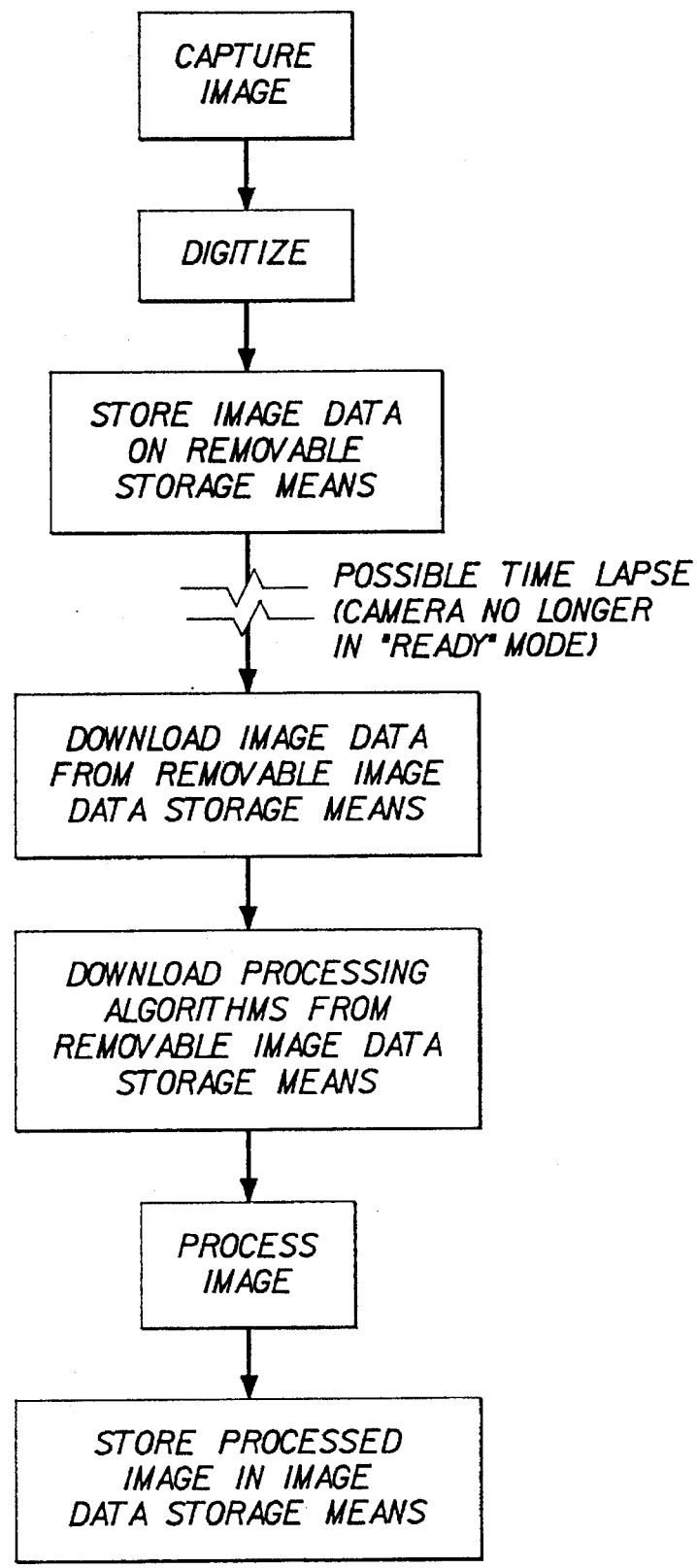
FIG. 5 is a flow diagram of the steps involved in processing an image sometime after storage in the camera of FIG. 2.

The steps involved in applying an image processing algorithm are shown in the flow diagram of FIG. 3. When the camera is ready to capture images, the processor 20 within the camera checks if there are software enhancements in the enhancement file 24b in the card 24. If such files are present, the processor 20 downloads the processing algorithm(s) in the enhancement file 24b contained in the removable memory card 24. If there is more than one algorithm, the user would preselect the appropriate one from the user input section 21, or the camera would select one according to the detected picture taking situation; absent any selection, the camera could use a default (or no) algorithm. Once the exposure is made, processing may commence. FIG. 4 is a block diagram of the capture chain showing several points at which processing may occur. The algorithms may be applied at point 40 after the image data is digitized. Processing according to the downloaded algorithm may alternatively take place as the image data is originally being processed for initial storage at points 42 or 44, or may be applied at a later time after the initial storage of the image is complete at point 46. FIG. 5 is a flow diagram showing the steps of subsequent processing at point 46 (FIG. 4), including after a time lapse. There may be utility in storing the initial capture in raw form so that different algorithms can be applied to achieve the most desirable result. The processing algorithms themselves, examples of which were described earlier, are conventional and not themselves part of this invention.

For all image data manipulations, it may be advantageous to postpone image data processing until some time after the capture is made as generally implied by processing point 46 in FIG. 4. This is to say that any processing which is done to the image beyond that which is necessary for initial storage may occur when the camera is in the "sleep" or "off" mode. This may be desirable so that the camera can be ready for the next exposure in the minimum time possible, and not be burdened with post-processing of the image during a time when image capture may still occur.

Figure 6:
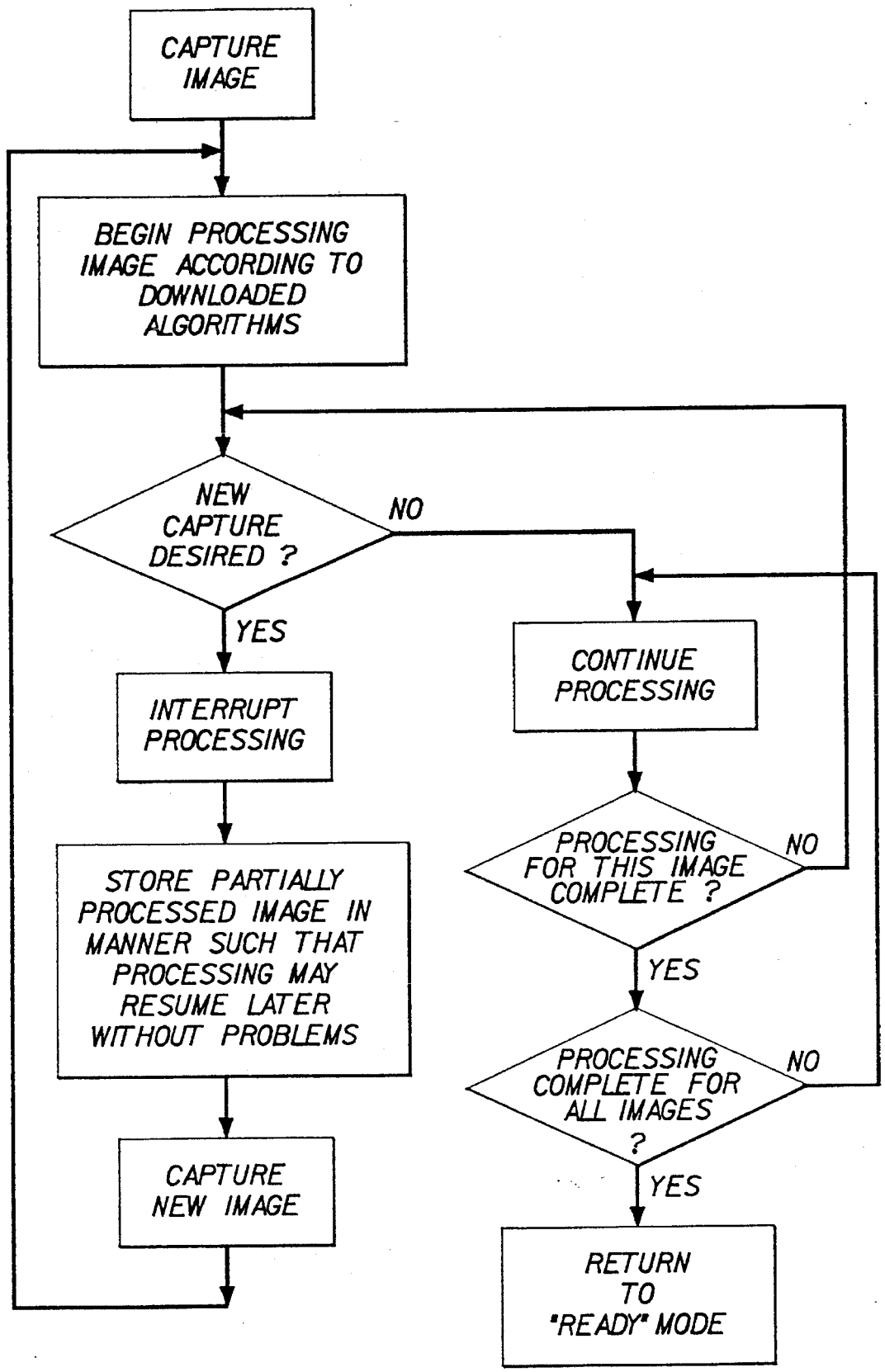
FIG. 6 is a flow diagram of the steps involved in interrupt processing in the camera of FIG. 2.

An alternative to delayed processing is to commence processing as soon as the capture is complete, and to interrupt the processing when the user indicates another capture must take place, as shown in FIG. 6. This is an acceptable means of processing the images, but may become complex if a number of images are captured in rapid succession. Delayed processing, as shown in FIG. 5, may be preferred. A flag in the image file header may be set to indicate if the image has been processed or not. A camera in the midst of a processing operation may be programmed to return to "ready" mode only after all processing for the current image is complete.

Figure 7:
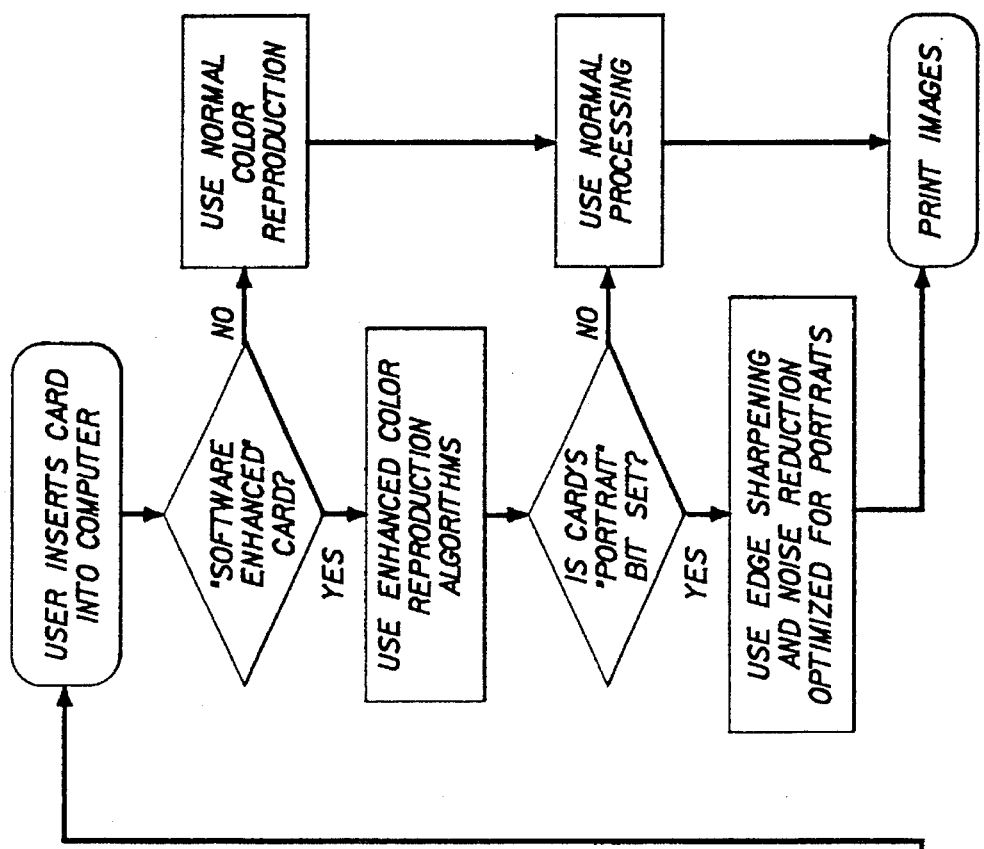
FIG. 7 is a flow diagram of the steps involved in controlling access to processing in the camera of FIG. 2.
Figure 7:
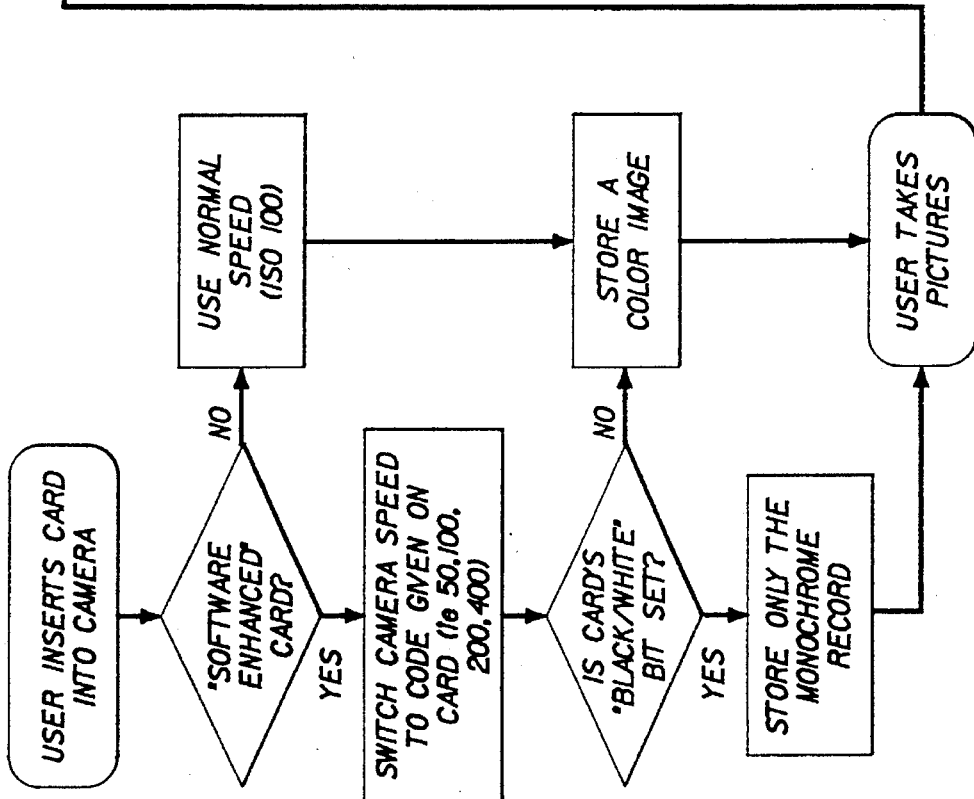

In addition to storing complete software algorithms, the software enhancement located in the enhancement file 24b on the card 24 can be codes which are used to allow access to certain features of the software already located in the camera (or computer), or to select among specific options for the software located in the camera (or computer). An example of the use of such access codes is shown in the flowchart of FIG. 7. When the card 24 is inserted into the camera 1, the camera checks to determine if the card is a normal memory card, or a "software enhanced" card. For PCMCIA cards, the use of the "software enhanced" card might be indicated, for example, by the use of a digital encryption key as part of the Card Information Structure. The card also includes special access codes for exposure index, color/monochrome, color reproduction and portrait. The camera may include variable gain corresponding, e.g., to ISO exposure indexes of 50, 100, 200, and 400. For normal cards, the camera speed is set at ISO 100. For software enhanced cards, the camera checks to see which speed should be used for the photos, depending on which version of the card the user has inserted into the camera. In this embodiment, the camera includes algorithms in the firmware memory 32 necessary for variable gain, and for storage of either color images or the monochrome record from the color image sensor 12. For software enhanced cards, a "black and white" bit of the card is checked, to see which algorithm should be used. The user then takes the desired photos, and inserts the card into the computer to print the images in the printer 6. When the card 24 is inserted into the computer 4, the computer checks the Card Information Structure to determine if the card is a normal memory card, or a "software enhanced" card. For normal cards, the normal processing is used. For "software enhanced" cards, more elaborate color reproduction algorithms might be used, to provide higher quality images. The card's "portrait bit" is also checked, to see if the user has selected a card for taking portraits. If so, the special processing is used to soften the image and reduce noise which might appear as facial blemishes. The image is then printed by the printer.

Figure 8:
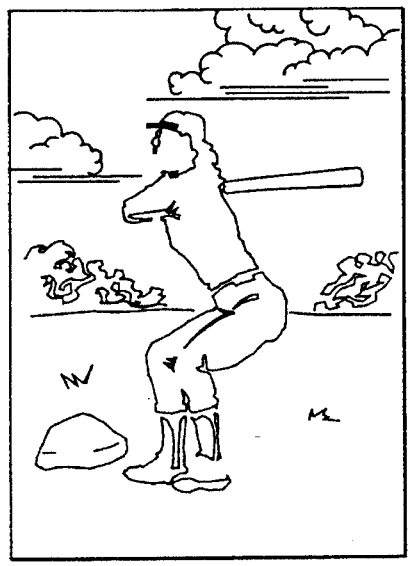
FIG. 8 is a pictorial illustration of the application of pre-existing overlay images to images captured by the camera of FIG. 2.
Figure 8:
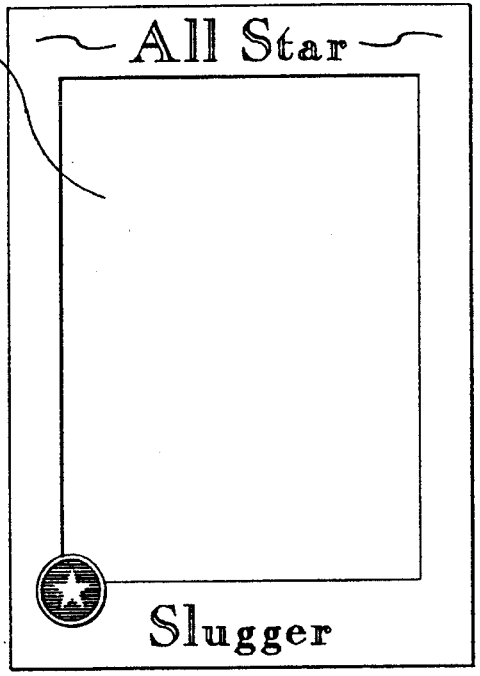
Figure 8:
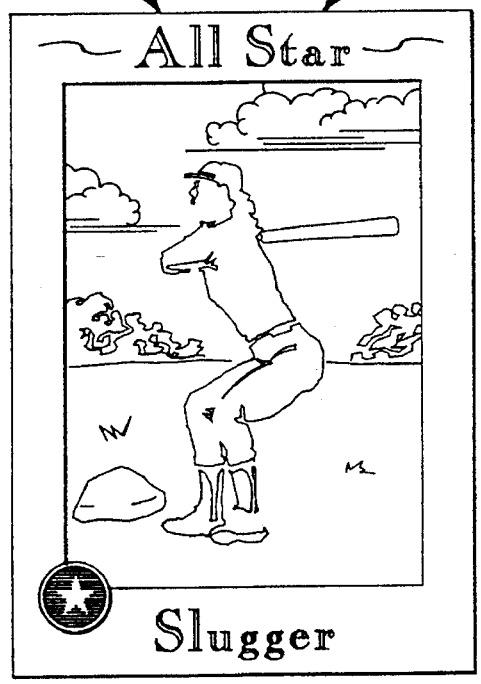
Figure 9:
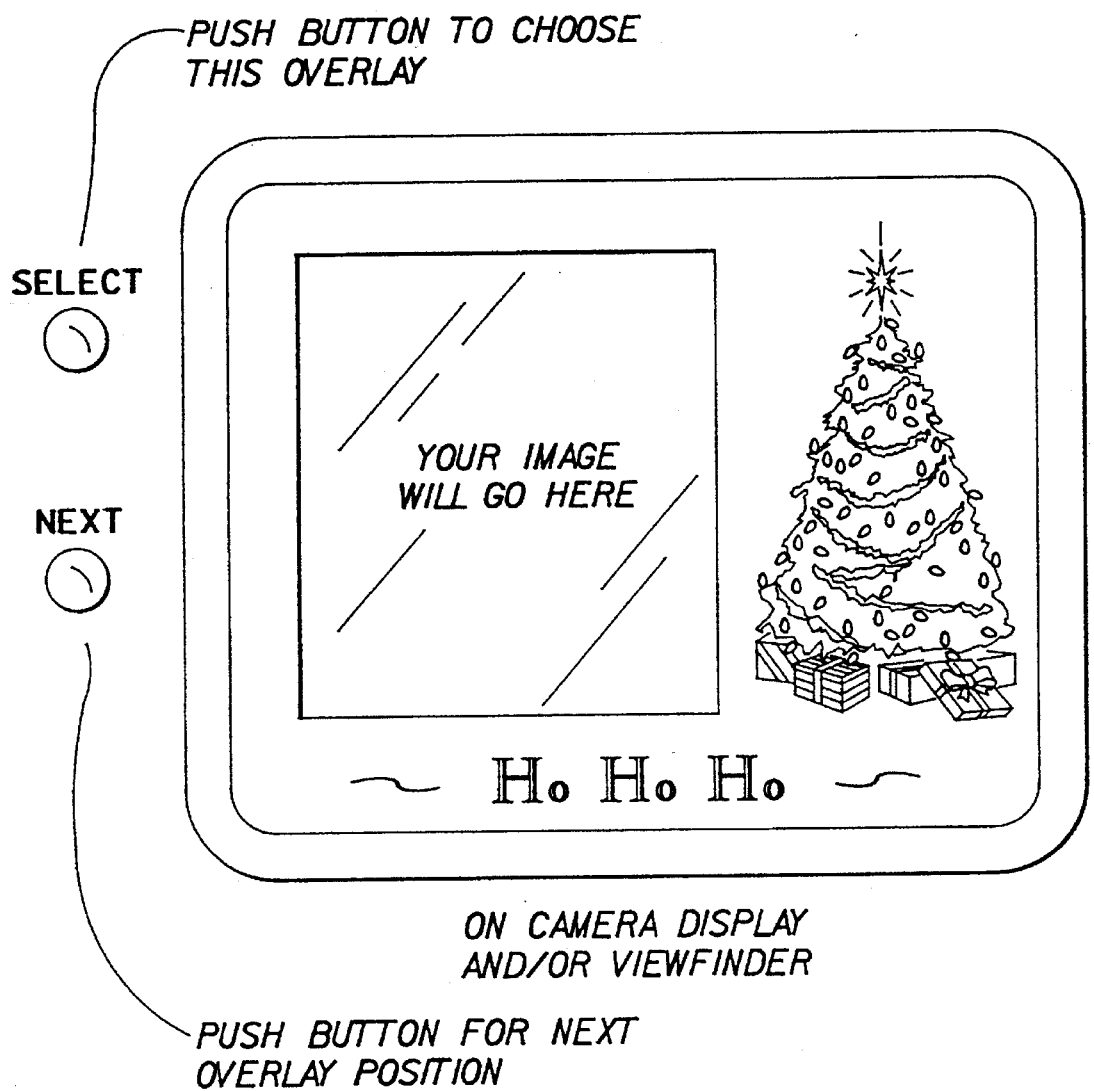
FIG. 9 is a pictorial illustration of the use of an electronic viewfinder in the camera of FIG. 2 to frame the captured image with respect to an overlay image.

"Pre-exposed" image data files can also be resident in the enhancement file 24b in the removable image data storage device. These files would include image templates or overlays for combination with user-captured images, as shown pictorially in FIG. 8. These files would likely be computer generated surrounds having the purpose of enhancing the images captured by the user for particular situations. The manner in which these files are combined with user captured images can be automatic or with user intervention through the user input section 21. In the camera, the processor 20 would retrieve the overlay and the digital processor 22 would insert the user captured image into the overlay surround. A given removable image storage device might be labeled as a Christmas Album, for example, and the camera would insert the user captured images into the seasonal templates without input from the user. The camera may prompt the user to frame the image appropriately with cues in the electronic viewfinder 29, as shown in FIG. 9. An outline of the template might appear in the viewfinder 29 to assist with framing. The camera should be capable of understanding where the "pre-exposed" overlay will appear in the final combined image in order to assist the user with framing. A file conveying this information may accompany the overlay data file, the information may be contained in the overlay data file header, or the camera may be capable of interpreting the location of the overlay by reading the overlay data file itself. Many different types of overlays may be used. The user could select removable image storage devices expressly for different seasonal or special events such as birthdays or sporting championships.

Implementation of graphic overlays can also be accomplished with user input. The user would select images and overlays according to personal preference after observing them in the viewfinder 29 or on a viewscreen (not shown) included in the camera. This ability implies an ability to browse both images and overlays contained on the image storage device by means of the camera. The camera must be capable of reading and displaying images from the removable storage device, and allowing the user to select both independently. In certain applications, more than one captured image could be inserted into an overlay. Alternatively, while a single image may be inserted, the framing of the image in the viewfinder relative to the overlay need not be in one-to-one correspondence between the captured image and the displayed image. That is, the captured image may be reduced so that the whole captured image is visible in the display through the overlay. Likewise, the captured image could be rotated or otherwise transformed as to position before being inserted into the overlay. Moreover, while the captured image may be shown through the overlay in the viewfinder, the camera may not actually combine these images, but rather create a script file which would direct the computer to do the proper combination. With adequate internal memory in the buffer 18 or multiple storage inputs (e.g., card slots 26), the camera might also allow selection of an overlay from one removable storage device to be combined with a captured image resident on another.

Figure 10:
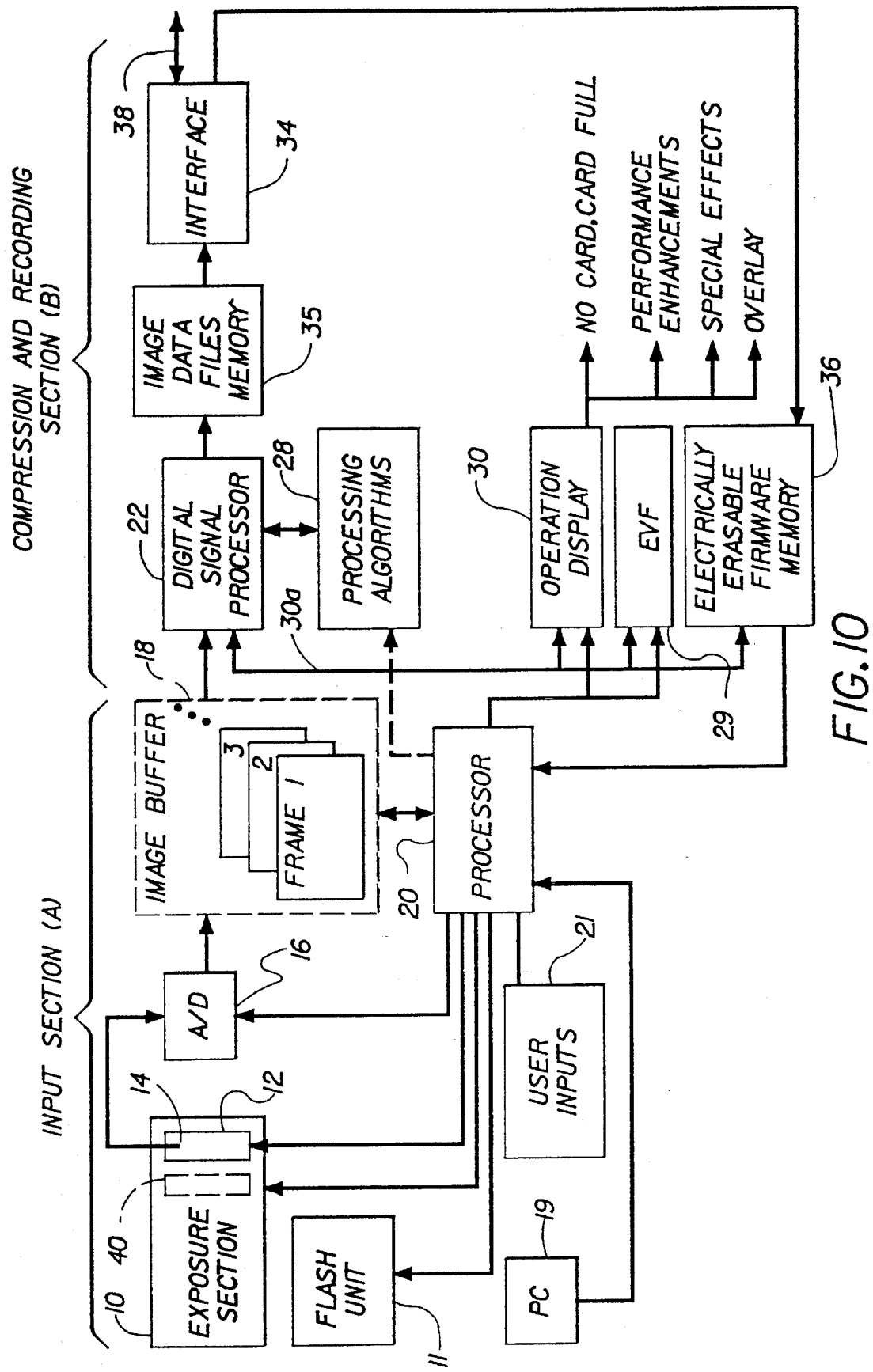
FIG. 10 shows an additional embodiment of an electronic camera configured according to the invention.
Figure 11:
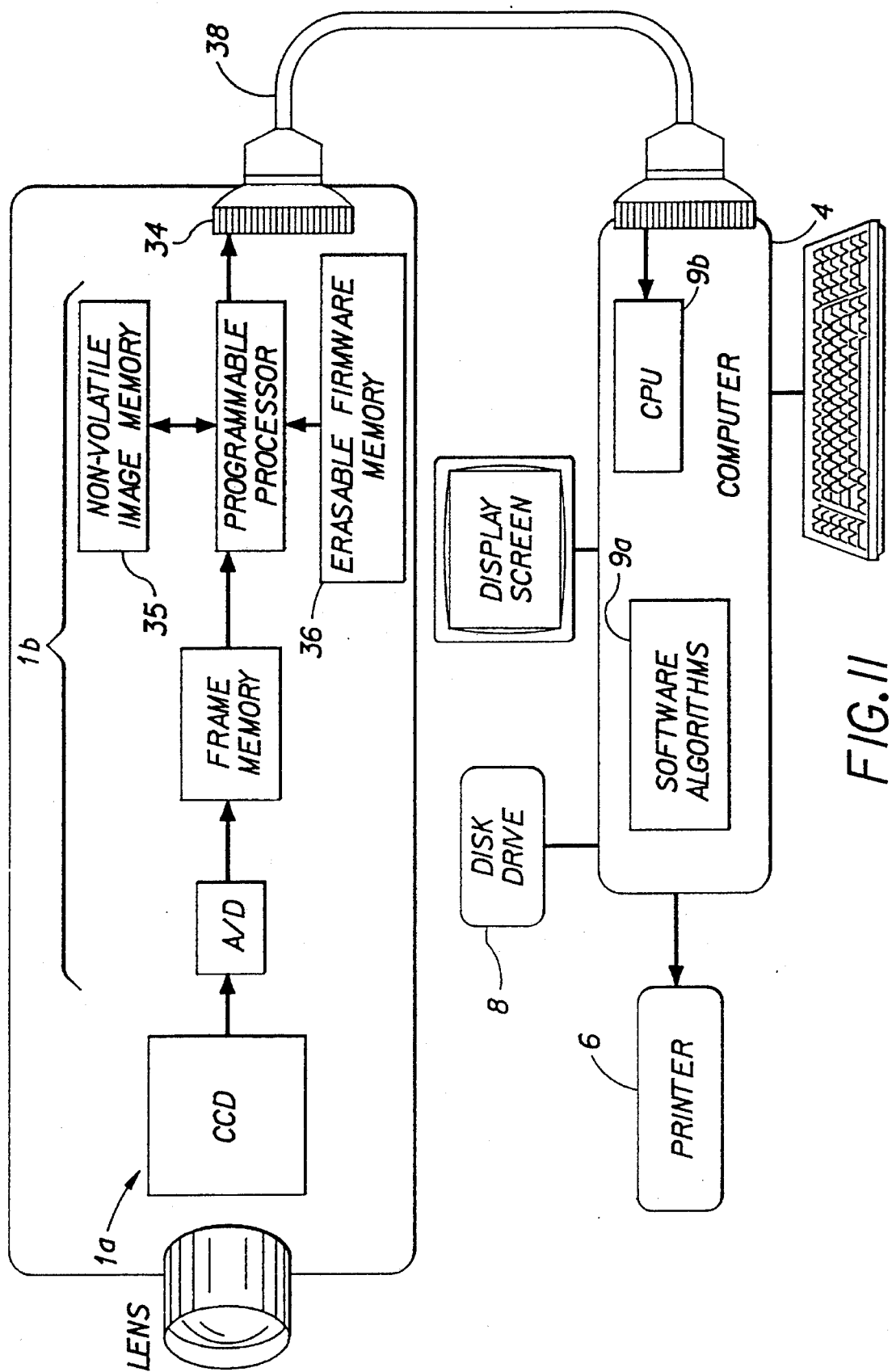
FIG. 11 shows an electronic imaging system incorporating the camera of FIG. 10 by means of a cable connection.

While the invention has been described with particular reference to several embodiments, it will be understood by those skilled in the art that various changes may be made and equivalents may be substituted for elements of the embodiments without departing from invention. For example, instead of using a removable memory card 24, the image data files 24a and enhancement files 24b could be stored in non-removable electrically programmable non-volatile memory located inside the camera. As shown in FIG. 11, image data would be downloaded from the non-volatile image memory 35 in the camera 1 to the computer 4 over a standard electrical computer interface cable 38, such as a RS-232 or SCSI interface connection. The enhancement file would be supplied on a floppy disk, downloaded to the computer 4, and then uploaded by the computer 4 to an electrically erasable firmware memory 36 in the camera 1 via the same interface cable 38. This additional embodiment of the invention is further shown in FIG. 10 in relation to an interface section 34 through which images are transferred to the computer 4 and operating software is uploaded from the computer to the electrically erasable firmware memory 36 in the camera. FIG. 11 generally shows the connection of the camera of FIG. 10 to a computer 4 by means of a standard electrical computer interface cable 38. In addition, many modifications may be made to adapt a particular situation without departing from the essential teachings of the present invention. It is accordingly intended that the claims shall cover all such modifications and applications as do not depart from the true spirit and scope of the invention.

PARTS LIST

1 ELECTRONIC CAMERA
1A ELECTRONIC SENSING SECTION
1B DIGITAL PROCESSING SECTION
2 MEMORY CARD SLOT
3 REMOVABLE MEMORY CARD
4 COMPUTER
5 MEMORY CARD READER
6 PRINTER
7 FIRMWARE MEMORY 7
8 HARD DRIVE
9A COMPUTER RAM MEMORY
9B CPU
10 EXPOSURE SECTION
11 FLASH UNIT
12 IMAGE SENSOR
14 OUTPUT DIODE
16 A/D CONVERTER
18 IMAGE BUFFER
20 CONTROL PROCESSOR
21 USER INPUTS SECTION
22 DIGITAL SIGNAL PROCESSOR
24 MEMORY CARD
24A SOLID STATE IMAGE MEMORY
24B ENHANCEMENT DATA FILES
26 INTERFACE
28 ALGORITHM MEMORY
29 ELECTRONIC VIEWFINDER
30 OPERATION DISPLAY PANEL
31 INSTRUCTION MEMORY
32 FIRMWARE MEMORY
34 INTERFACE
35 NON-VOLATILE IMAGE MEMORY
36 ELECTRICALLY ERASABLE FIRMWARE MEMORY
38 INTERFACE CABLE

What is claimed is:

1. An electronic imaging system comprising:

an electronic camera for capturing images and storing captured images; and a storage device removable from the camera for storing the images captured by the camera, said device capable of being preloaded with software for operating the electronic camera, wherein said camera includes an optical section for establishing optical parameters of image capture;

an image sensing section for electrically capturing an image provided by the optical section;

a signal processing section for processing the electrically captured image;

a programmable processor for controlling one or more of said sections of the camera, said programmable processor including a firmware memory for storing firmware for operating the processor; and means for loading the programmable processor with the software preloaded in the removable storage device for affecting operation of one or more of said sections of the system, said software substituting for some or all the firmware in the firmware memory.

2. An electronic imaging system as claimed in claim 1 wherein the software preloaded in the removable storage device modifies the performance of the optical section.

3. An electronic imaging system as claimed in claim 1 wherein the software preloaded in the removable storage device controls the signal processing section so as to modify the processing of the electrically-captured image.

4. An electronic imaging system as claimed in claim 1 wherein the software preloaded in the removable storage device includes at least one pre-existing image file that is to be combined with the electrically captured image in the signal processing section.

5. An electronic imaging system as claimed in claim 1 wherein said imaging system further comprises a player device including an interface for receiving said removable storage device and a software-driven processing unit, and wherein the software preloaded in the removable storage device is accessed by said processing unit for use therewith to operate the processing unit.

6. An electronic imaging system as claimed in claim 5 wherein said player device comprises a computer that can be optionally attached to a display screen or a printer for display or printing of the captured images, respectively.

7. An electronic imaging system as claimed in claim 1 wherein the storage device is a solid state memory card.

8. An electronic imaging system as claimed in claim 1 wherein the storage device is a magnetic medium.

9. An electronic imaging system as claimed in claim 1 wherein the storage device is a removable hard drive device.

10. An electronic camera for capturing and storing images in a removable digital storage device also containing preloaded software, said camera comprising:

an optical section for establishing optical parameters of image capture;

an image sensing section for electrically capturing an image provided by the optical section;

a signal processing section for processing the electrically captured image;

a programmable processor for controlling one or more of said sections of the camera, said programmable processor including a firmware memory for storing firmware for operating the processor; and means for loading the programmable processor with the software preloaded in the removable digital storage device for operation of the camera, said software substituting for some or all the firmware in the firmware memory.

11. An electronic camera as claimed in claim 10 wherein the software preloaded in the removable digital storage device modifies the performance of the optical section.

12. An electronic camera as claimed in claim 10 wherein the software preloaded in the removable digital storage device controls the signal processing section so as to modify the processing of the electrically-captured image.

13. An electronic camera as claimed in claim 11 wherein the software preloaded in the removable digital storage device includes at least one pre-existing image file that is combined with the electrically captured image in the signal processing section.

14. An electronic camera as claimed in claim 10 wherein said digital storage device is a memory card.

15. An electronic camera as claimed in claim 10 wherein said digital storage device is a hard drive device.

16. An electronic camera for capturing and storing images in a removable digital memory device also containing stored operating code, said camera comprising:

an image sensor for capturing an image and generating an image signal therefrom;

a programmable processor for operating upon the image signal;

a firmware memory for storing operating firm for the programmable processor;

a memory interface for electrically attaching the removable digital memory device to the camera; and means for uploading the stored operating code from the digital memory device through the memory interface to the firmware memory, whereby the stored operating code substitutes for some or all the firmware in the firmware memory and the operation of the programmable processor can accordingly be modified from the code stored in the memory device.

17. An electronic imaging system, comprising:

an electronic camera including an image sensor and a software-driven processor for operating the camera to capture images, said processor including a firmware memory for storing firmware for operating the processor; and a removable digital memory device for storing the images captured by the camera and software for controlling the operation of the processor in the camera, said software substituting for some or all the firmware in the firmware memory when the memory device is connected to the electronic camera.

18. An imaging system as claimed in claim 17 wherein the software stored in the removable memory device controls the performance of the camera.

19. An imaging system as claimed in claim 17 wherein the software stored in the removable memory device controls processing of a captured image.

20. An imaging system as claimed in claim 17 wherein the software stored in the removable memory device contains pre-existing image data that is combined with the captured images in the camera.

21. An imaging system as claimed in claim 17 wherein the software stored in the removable memory device updates the software-driven processor with software improvements.

22. A digital memory device that is removably attachable to an electronic camera of the type that captures images for storage in the memory device, said camera including firmware memory for storing firmware for operating the camera, said memory device comprising:

an interface section for electrically communicating with the electronic camera; and a memory section connected to said interface section, said memory section including first memory space allocated to the captured images and second memory space allocated to operating software, wherein said second memory space is preloaded with the software capable of substituting for some or all the firmware in the firmware memory for operating the camera.

23. A digital memory device as claimed in claim 22 wherein the software preloaded in said second memory space is capable of modifying the performance of the camera.

24. A digital memory device as claimed in claim 22 wherein the software preloaded in said second memory space is capable of processing the captured images in the camera.

25. A digital memory device as claimed in claim 22 wherein said second memory space is preloaded with pre-existing image files for combining with the captured images in the camera.

26. An electronic imaging system including an electronic camera for capturing and storing images, and a computer for processing the images, said camera comprising:

a storage device for storing images captured by the camera;

an interface for transferring stored images from the camera to the computer, said interface also capable of uploading software from the computer to the camera for operating the camera;

an optical section for establishing optical parameters of image capture;

an image sensing section for electrically capturing an image provided by the optical section;

a signal processing section for processing the electrically captured image;

a programmable processor for controlling said sections of the camera, said processor including an electrically erasable firmware memory for storing firmware for operating the processor; and means for loading the programmable processor with the software uploaded from the computer through the interface for substituting for some or all the firmware in the firmware memory and affecting operation of one or more of said sections of the camera.

27. An electronic imaging system as claimed in claim 26 wherein the software uploaded from the computer modifies the performance of the optical section.

28. An electronic imaging system as claimed in claim 26 wherein the software uploaded from the computer controls the signal processing section so as to modify the processing of the electrically-captured image.

29. An electronic imaging system as claimed in claim 26 wherein the software uploaded from the computer includes at least one preexisting image file that is to be combined with the electrically captured image in the signal processing section.

30. An electronic imaging system as claimed in claim 26 wherein the computer is optionally attached to a display screen or a printer for display or printing of the captured images, respectively.

31. An electronic imaging system as claimed in claim 26 wherein the storage device is a solid state memory card.

32. An electronic imaging system as claimed in claim 26 wherein said interface includes a cable connection between the camera and the computer.

33. An electronic imaging system as claimed in claim 26 wherein said interface includes a removable cable connection between the camera and the computer, and the camera is operable to capture the images while unconnected to the computer.

34. An electronic imaging system including an electronic camera for capturing and storing images, and a computer for processing the images, said electronic camera comprising:
   a storage device removable from the camera for storing the images captured by the camera, said device also preloaded with software for affecting processing of the images captured by the camera;
   an optical section for establishing optical parameters of image capture;
   an image sensing section for electrically capturing an image provided by the optical section;
   a signal processing section for processing the electrically captured image;
   a programmable processor for controlling said sections of the camera; and
   said computer comprising
      an interface for receiving said removable storage device;
      a software driven processing unit for processing the images downloaded through said interface;
      a RAM memory that stores firmware for operating the processing unit; and
      means for loading the processing unit with the software preloaded in the removable storage device for affecting processing of the images, wherein the software preloaded in the removable storage device substitutes for some or all the firmware in the RAM memory.

35. An electronic imaging system as claimed in claim 34 wherein the software preloaded in the removable storage device includes at least one pre-existing image file that is to be combined with the electrically captured image in the processing unit in the computer.

36. An electronic imaging system as claimed in claim 34 wherein said computer is optionally attached to a display screen or a printer for display or printing of the captured images, respectively.

37. An electronic imaging system as claimed in claim 34 wherein the storage device is a solid state memory card.

38. An electronic imaging system as claimed in claim 34 wherein the storage device is a magnetic medium.

39. An electronic imaging system as claimed in claim 34 wherein the storage device is a removable hard drive device.

40. An electronic camera for capturing and storing images in a removable digital storage device also containing preloaded software, said camera comprising:
   an optical section for establishing optical parameters of image capture;
   an image sensing section for electrically capturing an image provided by the optical section;
   a signal processing section for processing the electrically captured image;
   a viewfinder for displaying the captured image;
   a programmable processor for controlling said sections of the camera; and
   means for loading the programmable processor with the software preloaded in the removable digital storage device for operation of the camera, wherein the software preloaded in the removable digital storage device includes at least one pre-existing image file that is to be combined with the electrically captured image in the signal processing section, and wherein the pre-existing image file comprises an image overlay with at least one opening through which the captured image is displayed on the viewfinder.

41. An electronic camera for capturing and storing images in a removable digital storage device also containing preloaded software for subsequent processing by a computer, said camera comprising:
   an optical section for establishing optical parameters of image capture;
   an image sensing section for electrically capturing an image provided by the optical section;
   a signal processing section for processing the electrically captured image;
   a programmable processor for controlling said sections of the camera;
   means for loading the programmable processor with the software preloaded in the removable digital storage device for operation of the camera, wherein the software preloaded in the removable digital storage device includes at least one pre-existing image file that is to be combined with the electrically captured image; and
   means for selecting at least one pre-existing image file for combination with the captured image.

42. An electronic camera as claimed in claim 41 wherein said programmable processor effects the combination of the pre-existing image file with the captured image.

43. An electronic camera as claimed in claim 41 wherein said computer effects the combination of the pre-existing image file with the captured image.

44. An electronic imaging system as claimed in claim 1 wherein the software preloaded in the removable storage device modifies the performance of the image sensing section.

45. An electronic camera as claimed in claim 10 wherein the software preloaded in the removable digital storage device modifies the performance of the image sensing section.

46. An electronic imaging system as claimed in claim 26 wherein the software uploaded from the computer modifies the performance of the image sensing section.

47. An electronic camera for capturing and storing images in a removable digital storage device also containing preloaded software, said camera comprising:
   an optical section for establishing optical parameters of image capture;
   an image sensing section for electrically capturing an image provided by the optical section;
   a signal processing section for processing the electrically captured image;

a viewfinder for displaying the captured image;

a programmable processor for controlling said sections of the camera; and means for loading the programmable processor with the software preloaded in the removable digital storage device for operation of the camera, wherein the software preloaded in the removable digital storage device includes at least one pre-existing image file that is to be combined with the electrically capture image in the signal processing section, and wherein the pre-existing image file includes a plurality of pre-existing images; and means for selecting one of the plurality of pre-existing images for display in the viewfinder and for combination with the captured image.

* * * * *